United States Patent
Bowen, III

(10) Patent No.: US 9,740,907 B1
(45) Date of Patent: Aug. 22, 2017

(54) SYSTEMS AND METHODS FOR A SELF-IDENTIFYING BARCODE

(71) Applicant: Mueller International, LLC, Atlanta, GA (US)

(72) Inventor: Frank R. Bowen, III, Davidson, NC (US)

(73) Assignee: Mueller International, LLC, Atlanta, GA (US)

(*) Notice: Subject to any disclaimer, the term of this patent is extended or adjusted under 35 U.S.C. 154(b) by 0 days.

(21) Appl. No.: 15/196,441

(22) Filed: Jun. 29, 2016

(51) Int. Cl.
G06K 7/10 (2006.01)
G06K 7/14 (2006.01)
G06K 1/12 (2006.01)
G06K 19/06 (2006.01)

(52) U.S. Cl.
CPC ........... G06K 7/1413 (2013.01); G06K 1/121 (2013.01); G06K 19/06028 (2013.01)

(58) Field of Classification Search
CPC ..................... G06K 7/14; G06K 19/06028
USPC ................. 235/462.01, 462.1, 494
See application file for complete search history.

(56) References Cited

U.S. PATENT DOCUMENTS

2011/0073653 A1* 3/2011 Chiou ............... G06K 7/10722
235/462.12

* cited by examiner

*Primary Examiner* — Jamara Franklin
(74) *Attorney, Agent, or Firm* — Taylor English Duma LLP

(57) ABSTRACT

The present disclosure relates to systems, methods, and software for encoding self-identifying barcode data. Selection criteria can be received from a user to encode the self-identifying barcode data. The selection criteria can comprise one or more of a barcode version, a product code, a location, a date, a serial number, and a checksum version. A checksum of the self-identifying barcode data can be calculated and determined whether the checksum is valid. If the checksum is valid, the checksum can be appended to the self-identifying barcode data. The self-identifying barcode data can be sent to an external device to generate a self-identifying barcode.

20 Claims, 12 Drawing Sheets

| Position | Description | Base64-Encoded Characters | Range |
|---|---|---|---|
| 1 | Barcode Version | 1 | 0-63 |
| 234 | Barcode Field ID (Product Code) | 3 | 0 – 262,143 |
| 56 | Location | 2 | 0 – 4,095 |
| 789 | Date | 3 | 0 – 262,143 |
| abcde | Serial number | 5 | 0 – 1,073,741,823 |
| fg | Checksum | 2 | 0 – 4,095 |

*FIG. 4*

SYSTEMS AND METHODS FOR A SELF-IDENTIFYING BARCODE

BACKGROUND

Historically, tracking products in a warehouse or manufacturing facility has been a labor-intensive process. More recently, barcode scanning systems have been employed to increase the efficiency and accuracy of tracking products. Using a barcode scanning system, items within a warehouse are tagged with barcodes, which are optically readable by handheld barcode scanners. Furthermore, in a product assembly consisting of multiple parts, each part typically needs to be separately tagged and tracked until assembled. In order to take inventory using such a system, personnel are typically required to make rounds through the warehouse and scan each barcode with a barcode scanner. The barcode scanner is typically configured to log the barcode information electronically, thus reducing the time to log each article, and accordingly, reducing the overall time to take inventory. In addition, the barcode scanner often reads and logs the barcode information more accurately than human personnel, which can provide the benefit of increased accuracy of the inventory-taking process. However, due to the labor-intensive nature of the inventory-taking process with barcode scanners, several mistakes can occur.

Furthermore, it is often difficult to read some barcodes due to small pitch, caused by too much data in too small of a space. Some barcodes are too large to fit the available space on certain products. Mistakes can be caused by skipping an entry and cascading the error through additional fields or records, scanning the wrong label, or scanning the correct label at the wrong time. There also exists complicated data validation schemes due to non-standardized barcode labels.

It is with respect to these and other considerations that the disclosure made herein is presented.

BRIEF SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

According to some aspects, a method can comprise receiving, by a computer system, selection criteria from a user. The selection criteria can comprise one or more of a barcode version, a product code, a location, a date, a serial number, and a checksum version. The method can further comprise encoding, by the computer system, the self-identifying barcode data based on the selection criteria. The method can further comprise calculating, by the computer system, a checksum of the self-identifying barcode data based on the checksum version. The method can further comprise determining, by the computer system, whether the checksum is valid. Upon determining that the checksum is valid, the method can further comprise appending, by the computer system, the checksum to the self-identifying barcode data. The method can further comprise sending, by the computer system, the self-identifying barcode data to an external device to generate a self-identifying barcode.

According to further aspects, a computer-readable storage medium can comprise processor-executable instructions that cause a processor to receive selection criteria from a user. The selection criteria can comprise one or more of a barcode version, a product code, a location, a date, a serial number, and a checksum version. The processor can further encode self-identifying barcode data based on the selection criteria. The processor can further calculate a checksum of the self-identifying barcode data based on the checksum version. The processor can further determine whether the checksum is valid. Upon determining that the checksum is valid, the processor can further append the checksum to the self-identifying barcode data. The processor can further send the self-identifying barcode data to an external device to generate a self-identifying barcode.

According to further aspects, a system can comprise a memory, a processor operably connected to the memory, and a self-identifying barcode coding module residing in the memory. The self-identifying barcode coding module can be configured to cause the processor to receive selection criteria from a user. The selection criteria can comprise one or more of a barcode version, a product code, a location, a date, a serial number, and a checksum version. The self-identifying barcode coding module can be further configured to cause the processor to encode self-identifying barcode data based on the selection criteria. The self-identifying barcode coding module can be further configured to cause the processor to calculate a checksum of the self-identifying barcode data based on the checksum version. The self-identifying barcode coding module can be further configured to cause the processor to determine whether the checksum is valid. After a determination that the checksum is valid, the self-identifying barcode coding module can be further configured to cause the processor to append the checksum to the self-identifying barcode data. The self-identifying barcode coding module can be further configured to cause the processor to send the self-identifying barcode data to an external device to generate a self-identifying barcode.

These and other features and aspects of the various aspects will become apparent upon reading the following Detailed Description and reviewing the accompanying drawings. Furthermore, other examples are described in the present disclosure. It should be understood that the features of the disclosed examples can be combined in various combinations. It should also be understood that certain features can be omitted while other features can be added.

BRIEF DESCRIPTION OF THE DRAWINGS

The features and components of the following Figures are illustrated to emphasize the general principles of the present disclosure. Corresponding features and components throughout the Figures can be designated by matching reference characters for the sake of consistency and clarity.

FIG. 4 is a data listing showing illustrative tablature barcode label specification details for the methods and routines described herein.

DETAILED DESCRIPTION

Figure 1:
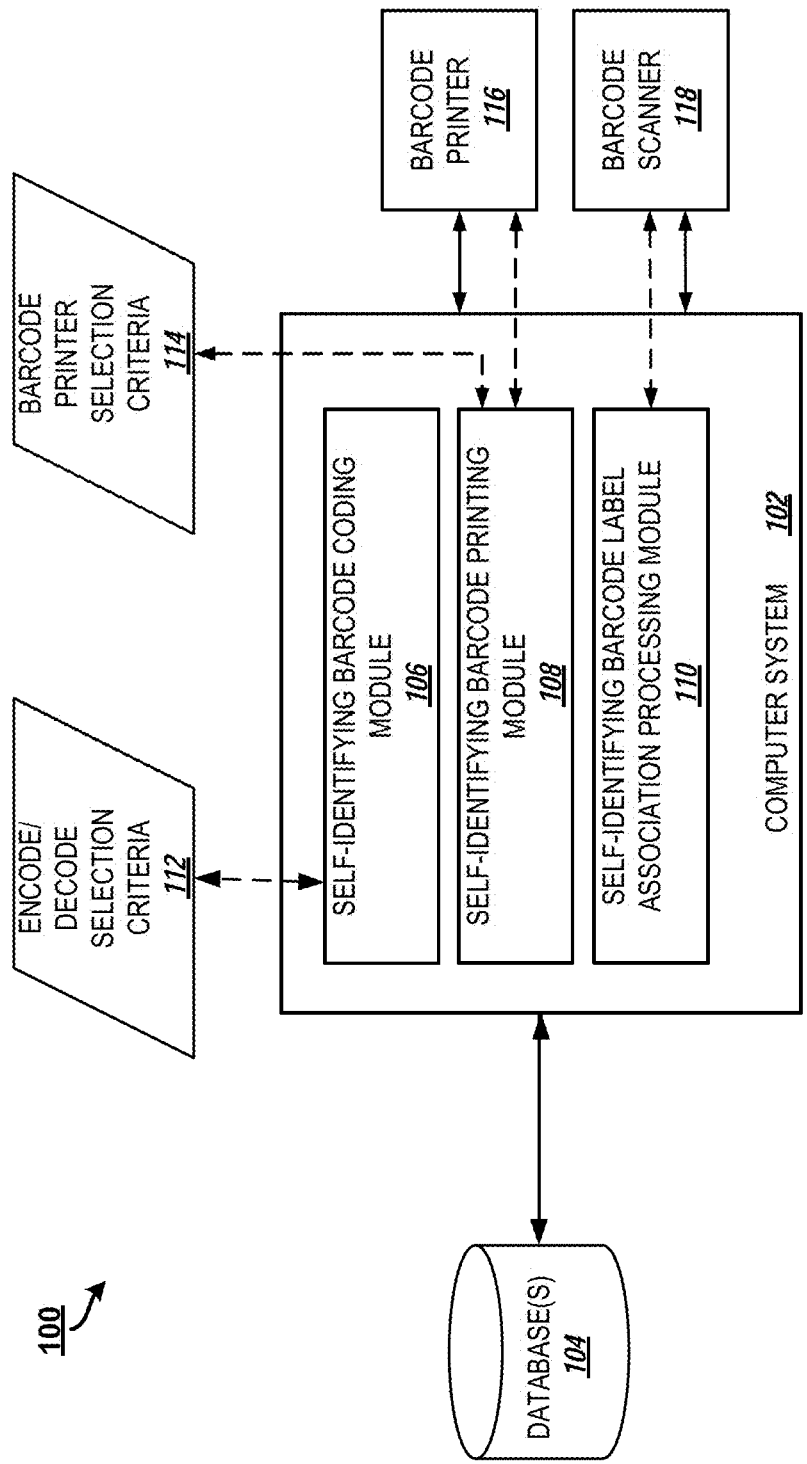
FIG. 1 is a block diagram showing aspects of an illustrative operating environment and several software components provided by the aspects presented herein.

The present disclosure can be understood more readily by reference to the following detailed description, examples, drawings, and claims. However, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspects. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" comprise plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The following detailed description is directed to accurate barcode scanning and data entry by use of a self-identifying barcode system. Other examples are described in the present disclosure. It should be understood that the features of the disclosed examples can be combined in various combinations. It should also be understood that certain features can be omitted while other features can be added.

Figure 2:
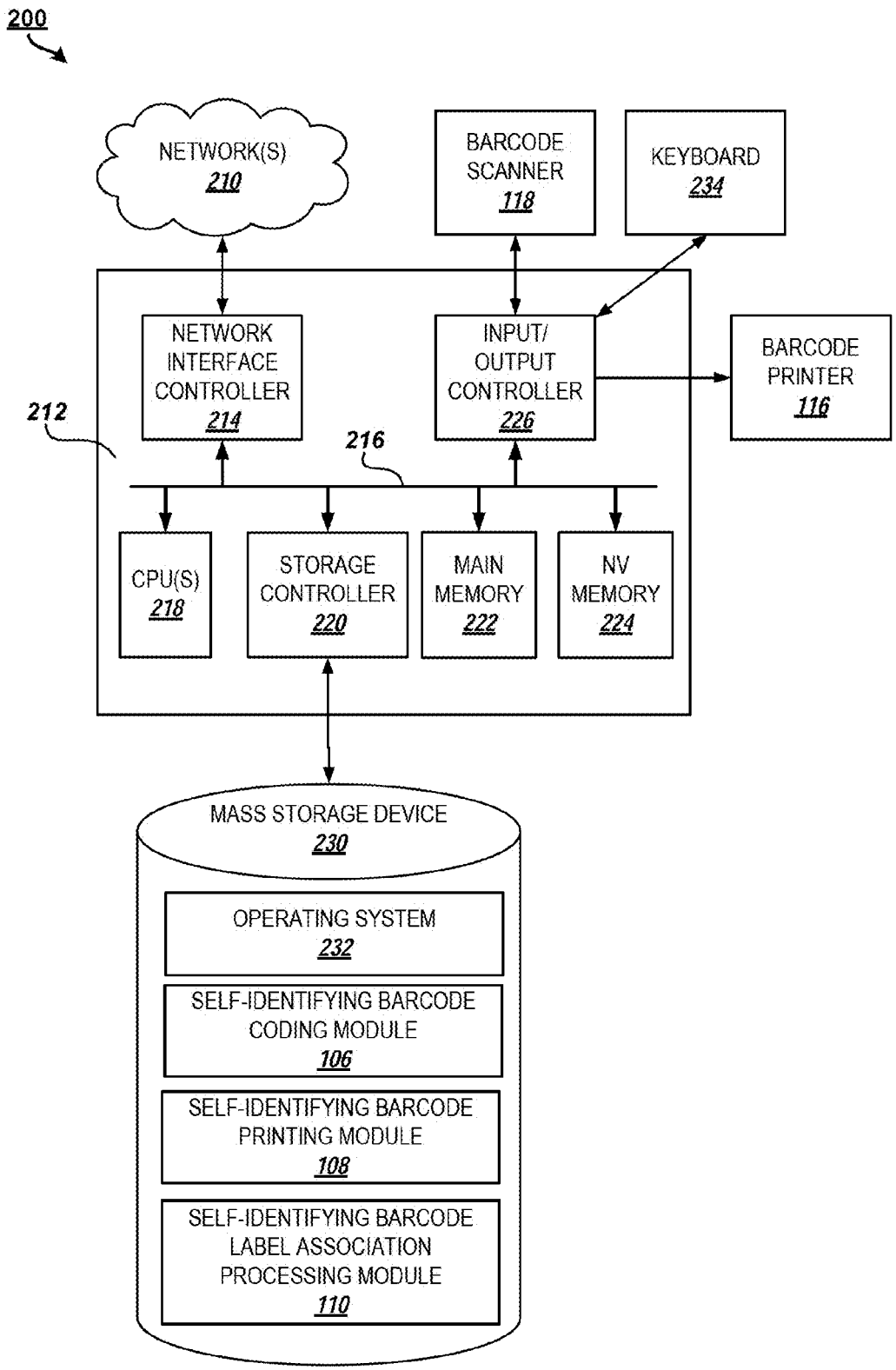
FIG. 2 is a block diagram illustrating a computer architecture for computing devices described herein as part of the self-identifying barcode system, according to various aspects of the present disclosure.

FIGS. 1-2 comprise particular components, modules, instructions, engines, etc. according to various examples as described herein. In different implementations, more, fewer, and/or other components, modules, instructions, engines, arrangements of components/modules/instructions/engines, etc. can be used according to the teachings described herein. In addition, various components, modules, engines, etc. described herein can be implemented as instructions stored on a computer-readable storage medium, hardware modules, special-purpose hardware (e.g., application specific hardware, application specific integrated circuits (ASICs), embedded controllers, hardwired circuitry, etc.), or some combination or combinations of these.

Generally, FIGS. 1-2 relate to components, modules, and instructions of a computing system. It should be understood that the computing system can comprise any appropriate type of computing system and/or computing device, including for example smartphones, tablets, desktops, laptops, workstations, servers, smart monitors, smart televisions, digital signage, scientific instruments, retail point of sale devices, video walls, imaging devices, peripherals, networking equipment, wearable computing devices, or the like.

FIG. 1 shows an illustrative operating environment of a self-identifying barcode system 100 including several software components for encoding self-identifying barcode data, according to aspects provided herein. The environment comprises a computer system 102. The computer system 102 can represent one or more database servers, application servers, web servers, network appliances, personal computers ("PCs") and/or other computing devices known in the art. The computer system 102 can implement an enterprise system, comprising a combination of application modules, components, data structures and the like executing in or stored on the computer system 102.

According to example aspects, a self-identifying barcode coding module 106, a self-identifying barcode printing module 108, and a self-identifying barcode label association processing module 110 executes on the computer system 102. Each of the modules, data, and/or software can provide functionality for the computer system 102, when executed by processors of the computer system 102. The modules, data, and/or the software may or may not correspond to physical locations and/or addresses in the computer system 102 memory. In other words, the contents of each of the modules 106, 108, and 110 cannot be segregated from each other and can, in fact be stored in at least partially interleaved positions on the memory of the computer system 102.

While the example aspects in FIG. 1 present the modules 106, 108, and 110 as being separate, in other example aspects the operations of these modules can be combined in any manner into fewer than the three modules presented. For example, the operations of self-identifying barcode coding module 106 and the self-identifying barcode printing module 108 can be combined. In another example, all of the operations of these modules 106, 108, and 110 can be completed by a single module. Any other combination and consolidation of operations of the modules 106, 108, and 110 is contemplated herein.

The database(s) 104 can be a relational database or other structured data storage system known in the art, such as a file system, an object store, or the like. The database(s) 104 can comprise a number of data tables, storing collections of like data structures or records.

The self-identifying barcode coding module 106 can select target records for extraction or copying from the database(s) 104 based on encode/decode selection criteria 112 to produce a Base64-encoded value to be used on the barcode. The encode/decode selection criteria 112 can include one or more specifications of a single value, a range of values and/or the like. The criteria for the encode/decode selection criteria 112 will be discussed further herein with regards to screenshot 1000 (shown in FIG. 10).

The self-identifying barcode printing module 108 can create a self-identifying barcode based on barcode printer selection criteria 114 to produce and print a barcode via the barcode printer 116. The barcode printer selection criteria 114 can include one or more specifications of a single value, a range of values and/or the like. The criteria for the barcode printer selection criteria 114 will be discussed further herein with regards to screenshot 1100 (shown in FIG. 11).

The self-identifying barcode label association processing module 110 can manage the association process of utilizing self-identifying barcodes in connection with a barcode scanner 118. The barcode scanner 118 can be any standard handheld scanner with the ability to read barcodes. In most aspects, the barcode scanner 118 can include a keyboard wedge hardware plugged between the computer system 102 and its normal keyboard, with characters from the barcode scanner 118 appearing exactly as if they had been typed at the keyboard. The self-identifying barcode label association processing module 110 will be discussed further herein with regards to methods 700 (shown in FIG. 7) and 800 (shown in FIG. 8), respectively, and with regards to screenshot 1200 (shown in FIG. 12).

In examples, the modules described herein, e.g., the self-identifying barcode coding module 106, the self-identifying barcode printing module 108, or the self-identifying barcode label association process module 110, can be a combination of hardware and programming instructions. The programming instructions can be processor executable instructions stored on a tangible memory resource such as a computer-readable storage medium or other memory resource, and the hardware can include a processing resource for executing those instructions. Thus the memory resource can be said to store program instructions that when executed by the processing resource implement the modules described herein.

FIG. 2 shows an example computer architecture 200 for a computer 212 capable of executing the software components described herein for accurate barcode scanning and data entry by use of a self-identifying barcode system, in the manner presented above. The computer architecture 200 shown in FIG. 2 illustrates a conventional server computer, PC, or other computing device, and can be utilized to execute any aspects of the software components presented herein described as executing on the computer system 102 or other computing platforms.

The computer 212 comprises a baseboard or "motherboard," which can be a printed circuit board containing a multitude of components or devices. The components and devices can be operably connected by way of a system bus 216 or other electrical communication paths. The system bus 216 can be implemented in a discrete set of components referred to as a "chipset," in some aspects. In further aspects, the computer 212 comprises one or more central processing units ("CPUs") 218. The CPUs 218 can represent standard programmable processors that perform arithmetic and logical operations necessary for the operation of the computer 212.

The CPUs 218 perform the necessary operations by transitioning from one discrete, physical state to the next through the manipulation of switching elements that differentiate between and change these states. Switching elements can generally comprise electronic circuits that maintain one of two binary states, such as flip-flops and electronic circuits that provide an output state based on the logical combination of the states of one or more other switching elements, such as logic gates. These basic switching elements can be combined to create more complex logic circuits, including registers, adders-subtractors, arithmetic logic units, floating-point units, or the like.

The system bus 216 can provide an interface between the CPUs 218 and the remainder of the components and devices on the baseboard. The system bus 216 can provide an interface to a main memory 222 of the computer 212, such as a random access memory ("RAM"). The system bus 216 can further provide an interface to a non-volatile memory 224, such as a read-only memory ("ROM") or non-volatile RAM ("NVRAM"), for storing basic routines that help to startup the computer 212 and to transfer information between the various components and devices. The main memory 222 and/or non-volatile memory 224 can also store software components necessary for the operation of the computer 212 in accordance with the aspects described herein.

According to various aspects, the computer 212 can operate in a networked environment using logical connections to remote computing devices and computer systems through one or more network(s) 210, such as a local-area network ("LAN"), a wide-area network ("WAN"), the Internet, or any other networking topology known in the art that connects the computer 212 to remote computers. The system bus 216 can provide an interface to a network interface controller ("NIC") 214, such as a gigabit Ethernet adapter.

For example, the NIC 214 can be capable of connecting the computer 212 to other computers or systems over the networks(s) 210, such as the database(s) 104 described above in regard to FIG. 1. It should be appreciated that any number of NICs 214 can be present in the computer 212, connecting the computer to other types of networks and remote computer systems.

The computer 212 can be connected to a mass storage device 230 that provides non-volatile storage for the computer. The mass storage device 230 can store system programs, application programs, other program modules and data, which are described in greater detail herein. The mass storage device 230 can be connected to the computer 212 through a storage controller 220 connected to the system bus 216. The mass storage device 230 can comprise one or more physical storage units. The storage controller 220 can interface with the physical storage units through a serial attached SCSI ("SAS") interface, a serial advanced technology attachment ("SATA") interface, a fiber channel ("FC") interface or other standard interface for physically connecting and transferring data between computers and physical storage devices.

The computer 212 can store data on the mass storage device 230 by transforming the physical state of the physical storage units to reflect the information being stored. The specific transformation of physical state may depend on various factors, in different implementations of this description. Examples of such factors can comprise, but are not limited to, the technology used to implement the physical storage units, whether the mass storage device 230 is characterized as primary or secondary storage or the like. For example, the computer 212 can store information to the mass storage device 230 by issuing instructions through the storage controller 220 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 212 can further read information from the mass storage device 230 by detecting the physical states or characteristics of one or more particular locations within the physical storage units.

In addition to the main memory 222, non-volatile memory 224, and mass storage device 230 described above, the computer 212 can comprise access to other computer-readable medium to store and retrieve information, such as program modules, data structures, or other data. It should be appreciated by those skilled in the art that computer-readable media can be any available media that can be accessed by the computer 212, including computer-readable storage media and communications media. Communications media comprises transitory signals. Computer-readable storage media comprises volatile and non-volatile, removable and non-removable storage media implemented in any method or technology for the non-transitory storage of information. For example, computer-readable storage media comprises, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices, and the like.

The mass storage device 230 can store an operating system 232 utilized to control the operation of the computer 212. According to one aspect, the operating system 232 comprises the LINUX operating system. According to another aspect, the operating system comprises the WINDOWS® SERVER operating system from MICROSOFT Corporation of Redmond, Wash. According to further aspects, the operating system can comprise the UNIX or SOLARIS operating systems. It should be appreciated that other operating systems can also be utilized.

The mass storage device 230 can store other system or application programs and data utilized by the computer 212, such as the self-identifying barcode coding module 106, the self-identifying barcode printing module 108, or the self-identifying barcode label association processing module 110 that was described above in regard to FIG. 1. In one aspect, the mass storage device 230 or other computer-readable storage media can be encoded with computer-executable instructions that, when loaded into the computer 212, can transform the computer from a general-purpose computing system into a special-purpose computer capable of implementing the aspects described herein. These computer-executable instructions transform the computer 212 by specifying how the CPUs 218 transition between states, as described above. According some aspects, the computer 212 can comprise access to computer-readable storage media storing computer-executable instructions that, when executed by the computer, perform the routines 500-800 described herein for encoding/decoding a barcode, printing a barcode, and utilizing a self-identifying barcode to track inventory, as described herein in regard to FIGS. 5-8.

The computer 212 can also comprise an input/output controller 226 for receiving and processing input from a number of input devices, such as a barcode scanner 118, keyboard 234, a mouse, a touchpad, a touch screen, an electronic stylus, or other type of input device. Similarly, the input/output controller 226 can provide output to a display device, such as a computer monitor, a flat-panel display, a digital projector, a printer 116, a plotter, or other type of output device. It will be appreciated that the computer 212 may not comprise all of the components shown in FIG. 2, may comprise other components that are not explicitly shown in FIG. 2, or may utilize an architecture completely different than that shown in FIG. 2.

In some aspects, the self-identifying barcode coding module 106, the self-identifying barcode printing module 108, or the self-identifying barcode label association processing module 110 can comprise a processing resource, such as a central processing units (CPUs), microprocessors, digital signal processors, and/or other hardware devices suitable for retrieval and execution of instructions. The self-identifying barcode coding module 106, the self-identifying barcode printing module 108, or the self-identifying barcode label association processing module 110 can also comprise suitable memory such as random access memory (RAM), electrically-erasable programmable read-only memory (EPPROM), a storage drive, an optical disk, and any other suitable type of volatile or non-volatile memory that stores instructions to cause a programmable processor (i.e., the processing resource) to perform the techniques described herein. The self-identifying barcode coding module 106, the self-identifying barcode printing module 108, or the self-identifying barcode label association processing module 110 can comprise additional electrical components in other examples.

Figure 3:
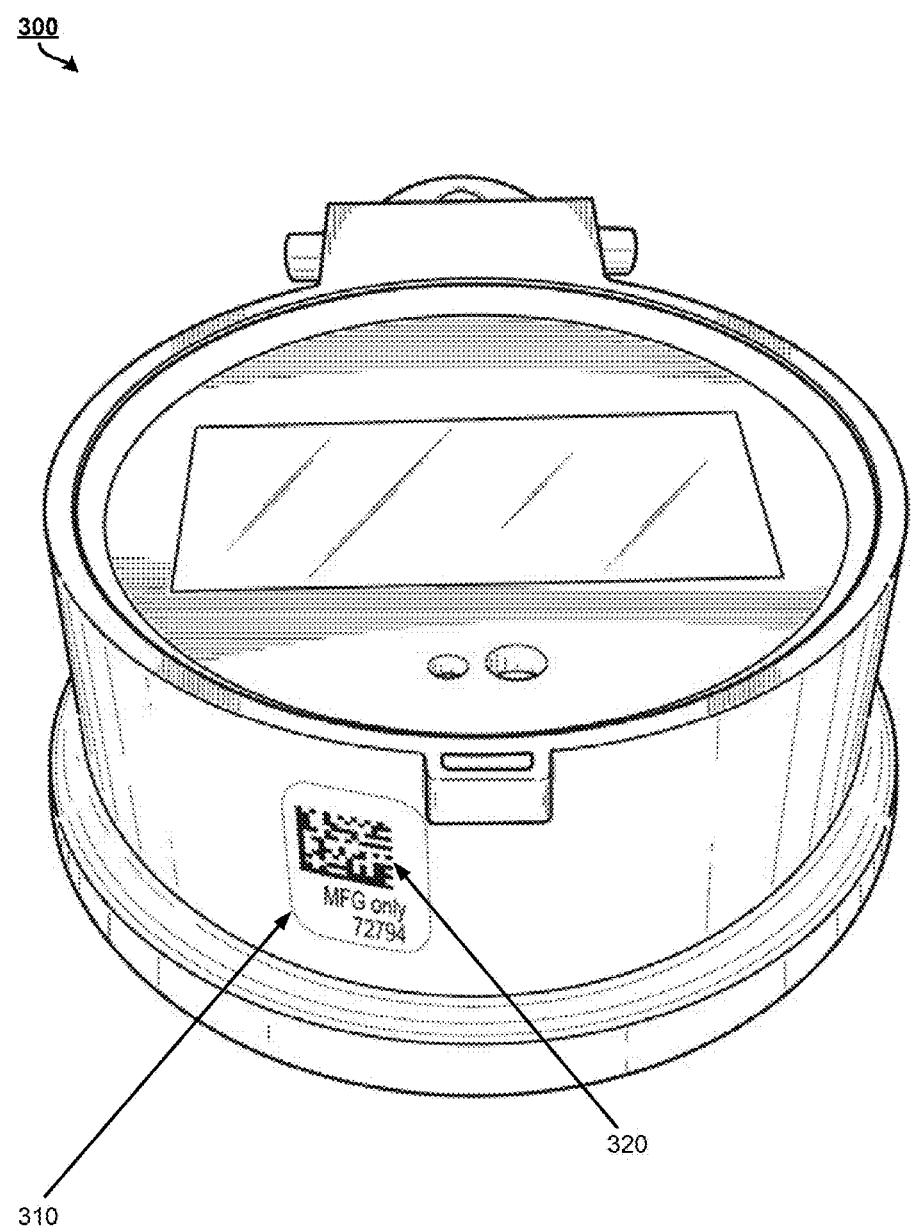
FIG. 3 illustrates an assembled view of a solid-state register (SSR) with a self-identifying barcode, according to aspects of the present disclosure.

FIG. 3 illustrates an assembled view of a solid-state register (SSR) assembly 300, including a self-identifying barcode label 310, according to examples of the present disclosure. The self-identifying barcode label 310 comprises a self-identifying barcode 320. In the present example as shown, the SSR serial number is "72794", and the raw data for this barcode 320 is "0003041NH00HnQDL". As further described herein for table 400, FIG. 4, the self-identifying barcode 320 raw data would correspond to the following data values: Version: 0; Product Code: 3; Location: 4; Date: Friday, Apr. 17, 2015; Serial Number: 72794; Checksum: 853; Encoded value: 0003041NH00HnQDL.

FIG. 4 shows one example of a table 400 which shows a data listing of illustrative tablature barcode label specification details for the methods and routines described herein. In some aspects, the self-identifying barcode system contains all of the data compressed into 16 printable characters as shown in table 400 in FIG. 4.

Column 414 indicates the starting position of the data encoded within the 16 character barcode. For example, the 16 character positions, "123456789abcdefg", are in the position column, and are each labeled a different a character, e.g. 1-g, for example purposes only. Column 416 displays the description of the data for the associated position. Column 418 provides the number of Base64-encoded characters for the data at the associated position. Based on the number Base64-encoded characters, column 420 displays the mathematical range of possibilities for the data for each position. In other aspects other encoding schemes can be utilized to encode the data items other than Base64, resulting in different lengths and positions of the data.

Table 400 illustrates each Base64 character position in the encoded value. For illustrative purposes, table 400 displays the label character positions in column 414, as assigned different characters. Thus, the raw data that would be encoded into the barcode for this example would be: "123456789abcdefg". The first position, character "1", indicates the barcode version, with a range 0-63, as displayed in barcode version row 402. Therefore, depending on the number of software updates, the self-identifying barcode system 100 can comprise multiple different versions of barcodes and corresponding software used, but could still utilize the same self-identifying barcode 320. For example, another self-identifying barcode version software can use a different checksum methodology, as described further herein.

Row 404 displays the Barcode Field identification (ID), or otherwise known as a product code in the example aspect. By utilizing three character positions, characters "234" in the example shown, the self-identifying barcode system 100 would comprise a possibility of 262,144 different product codes that could be used. This wide range can be able to satisfy most product situations as described herein. In the example aspect, an SSR contains three components that are each individually barcoded at a manufacturing site. For example, "002" can equate to the SSR's printed circuit board (PCB), "003" can equate to the SSR's housing, and "004" can equate to the SSR's faceplate.

In other aspects, as further discussed herein, depending on the version of the barcode system, the character positions in row 404 could be used other than a product code. For example, Barcode Field ID could be used to identify to the system that a specific location will be identified by the serial number, or that the serial number will represent a quantity. Thus, the barcode label 310 can provide more functionality than creating unique serial numbers for certain products.

Row 406 displays a location field. Characters "56" are used in the example shown. Using two character positions, Base64 provides a possibility of 4,096 locations this barcode that can be encoded in the example aspect. For example, "04" would equal a specific location that the product originated, or was manufactured.

Row 408 displays a date field. Characters "789" are used in the example shown. Using three character positions as Base64 provides a possibility of 262,144 dates for this barcode that can be encoded in the example aspect. For example, "000" would begin on Jan. 1, 2000. Each increment of one would add one day. Therefore, "001" would equal Jan. 2, 2000. Therefore, in the example aspect, this dating system would be valid for 718 years.

Row 410 displays a serial number. Characters "abcde" are used in the example shown. Using five character positions, Base64 provides a possibility of over one billion serial numbers for this barcode that can be encoded in the example aspect. The serial number would be a unique, non-repeating number that the self-identifying barcode system 100 would track.

Row 412 displays a checksum field. Characters "fg" are used in the example shown. Using two character positions, Base64 provides a possibility of 4,096 different checksum possibilities for this barcode that can be encoded in the example aspect. The checksum in the example aspect is calculated by summing the American Standard Code for Information Interchange (ASCII) values of all previous fields, including version and barcode field ID, and then encoded in the same Base64. In some aspects, a weighted checksum can be used. In other aspects, the checksum value may comprise a hash, a CRC value, and parity word, or any other fixed length data that may be used to verify data integrity known in the art.

For the example aspect, the checksum helps the self-identifying barcode system 100 authenticate that the data read is a valid self-identifying barcode. The checksum is typically needed at the keyboard level because most scanners are setup to simulate keyboard data entry. Although most barcode symbologies comprise their own error checking, it is done at the barcode level instead of the keyboard level. The self-identifying barcode system 100 can provide error checking at both levels. For example, a common error is caused by scanning a barcode while the user is accidently pressing a key on the keyboard 234 with a cable assembly attached to the SSR, and an additional keystroke added to the scanned barcode can go undetected, causing a number of issues. Thus, the checksum in the self-identifying barcode system 100 catches this error before it becomes an issue.

In further aspects, the encoded values in the self-identifying barcode system 100 can be used for warehouse inventory control. The self-identifying barcode system 100 can increase accuracy and reduce labor when performing a physical inventory. For example, Barcode Field ID contains a "data type" code that indicates how the data in positions 10-14 ("abcde") are to be interpreted. Thus, instead of using the Barcode Field ID in row 404, position "234" (as shown in row 404 of FIG. 4) to indicate a "Produce Code", a location self-identifying barcode label 310 can be encoded with a Barcode Field ID to indicate a specific location, where now the serial number is a reference to a specific place at the location identified by position "56" in row 406, such as "Shelf 17 in row 24B", or "Box 3 on shelf 13." Further, the products could comprise a self-identifying barcode label 310 with a Barcode Field ID to indicate a part number, and the serial number can be a reference to the part number, such as "V0G1234-71G." Moreover, sealed containers can comprise a self-identifying barcode label 310 that could use Barcode Field ID to indicate a quantity, where the serial number is the actual quantity within the sealed container.

In another example aspect, the self-identifying barcode system 100 can be used for testing a product. To define test commands, for example, the Barcode Field ID can be set to indicate test commands, and the serial number can be a reference to an actual command, such as "Start", "Pause", "Cancel", "End", or "Re-Test". To define test station positions, the Barcode Field ID can be set to indicate test positions, where the serial number can be a reference to the actual test position.

Figure 5:
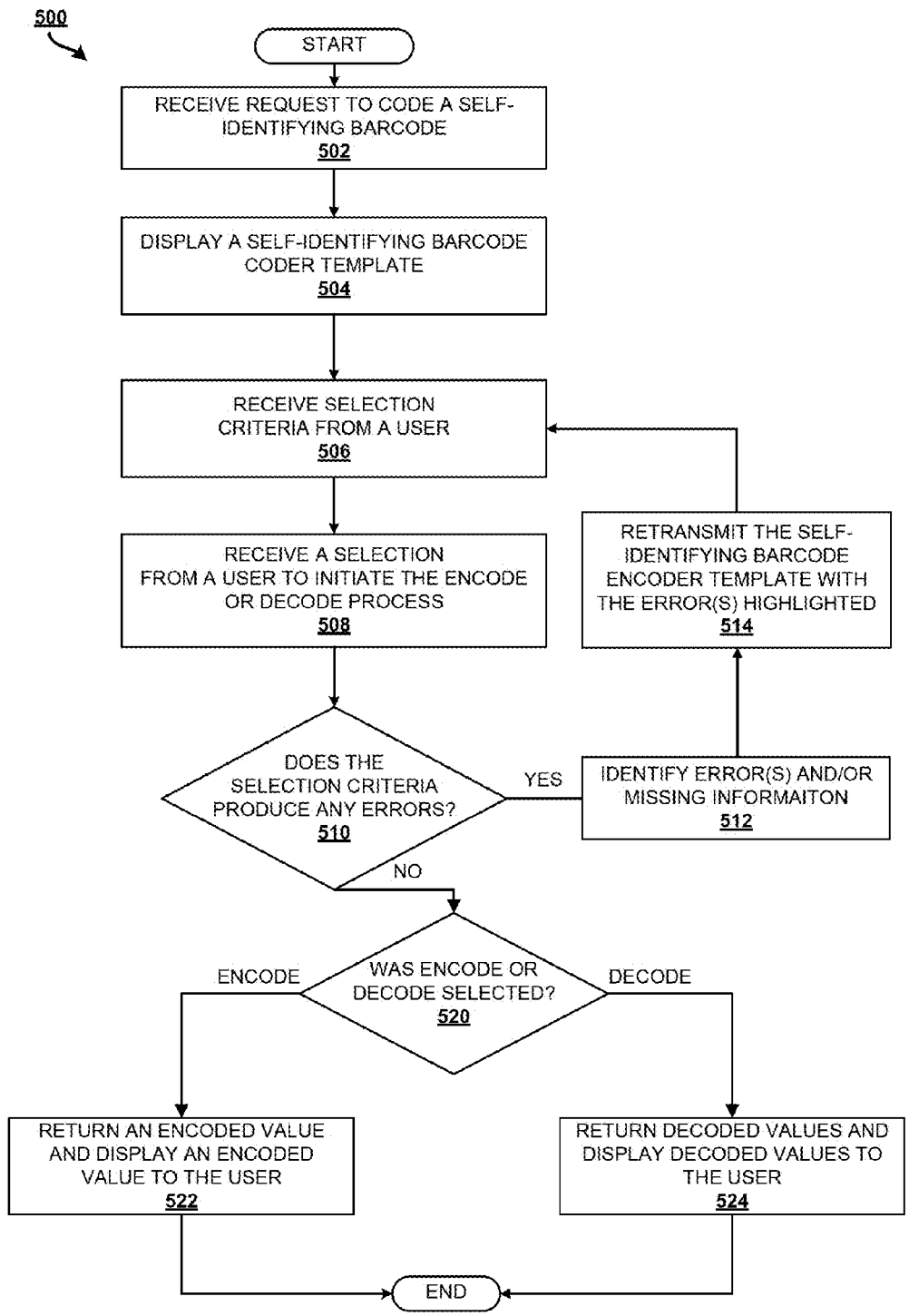
FIG. 5 is a flow diagram illustrating one method for encoding and decoding a self-identifying barcode, according to various aspects of the present disclosure.

FIG. 5 shows one example of a method 500 for encoding and decoding a self-identifying barcode with the self-identifying barcode system 100, according to various aspects of the present disclosure. The method 500 can enable a user to encode or decode a self-identifying barcode utilizing the self-identifying barcode coding module 106. In this aspect, the method 500 comprises the step of receiving a request to code a self-identifying barcode, as indicated in step 502. The request can come from a user using a software interface implemented on the self-identifying barcode system 100. In some aspects, the request can be triggered automatically by scanning a self-identifying barcode with programmed instructions to implement method 500.

At step 504, a self-identifying barcode coder template is displayed to the user, awaiting further instructions. The user enters certain selection criteria at step 506. Depending on whether the user wants to encode the parameters listed into an encoded value, or decode an encoded value in order to see the embedded code, determines the parameters the user can enter. This is further discussed herein for screenshot 1000, FIG. 10. Following the selection criteria being entered, the method 500 continues by receiving a selection from the user to initiate either the encode or decode process at step 508. At step 510, the self-identifying barcode system 100 determines if the selection criteria, comprise the coding selection (encode or decode), produces any errors. If yes, then at step 512 the self-identifying barcode system 100 identifies the error(s) and/or any missing information, and at step 514, highlights those errors and returns to step 506 to await the user to correct those errors and input additional selection criteria. However, if at step 510 it is determined that no errors are produced, then the self-identifying barcode system 100, at step 520, proceeds according the code selection that was chosen. If encode was selected, then at step 522, the self-identifying barcode system 100 returns an encoded value and displays the encoded value to the user. In the example aspect, the encoded value is the 16 printable characters in Base64, and as shown in value 1014 in screenshot 1000 as discussed herein. If decode was selected, than the self-identifying barcode system 100 at step 524 returns the decoded values and displays the decoded values to the user. In the example aspect, the decoded values are the raw data that would be encoded into the barcode from row 414, in FIG. 4, which for this example would be: "123456789abcdefg". This is also further discussed herein and shown in screenshot 1000, elements 1002-1012, in FIG. 10.

Figure 6:
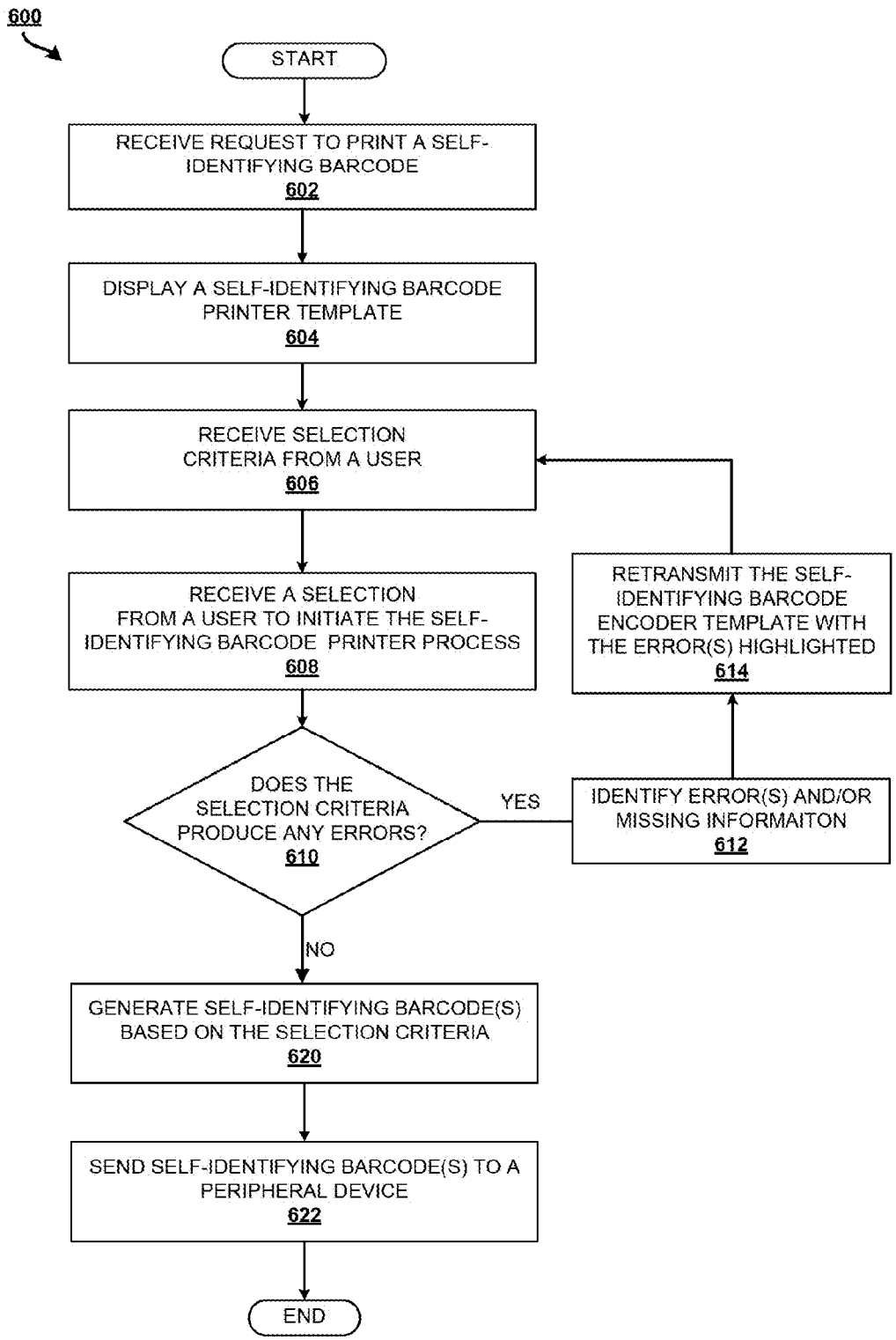
FIG. 6 is a flow diagram illustrating one method for printing a self-identifying barcode, according to various aspects of the present disclosure.

FIG. 6 shows one example of a method 600 printing a self-identifying barcode with the self-identifying barcode system 100, according to various aspects of the present disclosure. The method 600 can enable a user to create and print a self-identifying barcode utilizing the self-identifying barcode printing module 108. Method 600 is further discussed herein for screenshot 1100, FIG. 11.

In this aspect, the method 600 comprises the step of receiving a request to print a self-identifying barcode, as indicated in step 602. The request can come from a user using a software interface implemented on the self-identifying barcode system 100. In some aspects, the request can be triggered automatically by scanning a self-identifying barcode with programmed instructions to implement method 600.

At step 604, a self-identifying barcode printer template is displayed to the user, awaiting further instructions. The user enters selection criteria at step 606. Following the selection criteria being entered, the method 600 continues by receiving a selection from the user to initiate the printer process at step 608. At step 610, the self-identifying barcode system 100 determines if the selection criteria produces any errors. If yes, then at step 612 the self-identifying barcode system 100 identifies the error(s) and/or any missing information, and at step 614, highlights those errors and returns to step 606 to await the user to correct those errors and input additional selection criteria. However, if at step 610 it is determined that no errors are produced, then the self-identifying barcode system 100, at step 620, proceeds to generate the self-identifying barcode(s) based on the selection criteria. As shown in screenshot 1100, the user has the ability print several barcodes at the same time, where the system automatically tracks and assigns unique serial numbers to each barcode. Following step 620, at step 622, the self-identifying barcode system 100 sends the generated self-identifying barcode(s) to a peripheral device, such as a printer, to print the barcodes.

Figure 7:
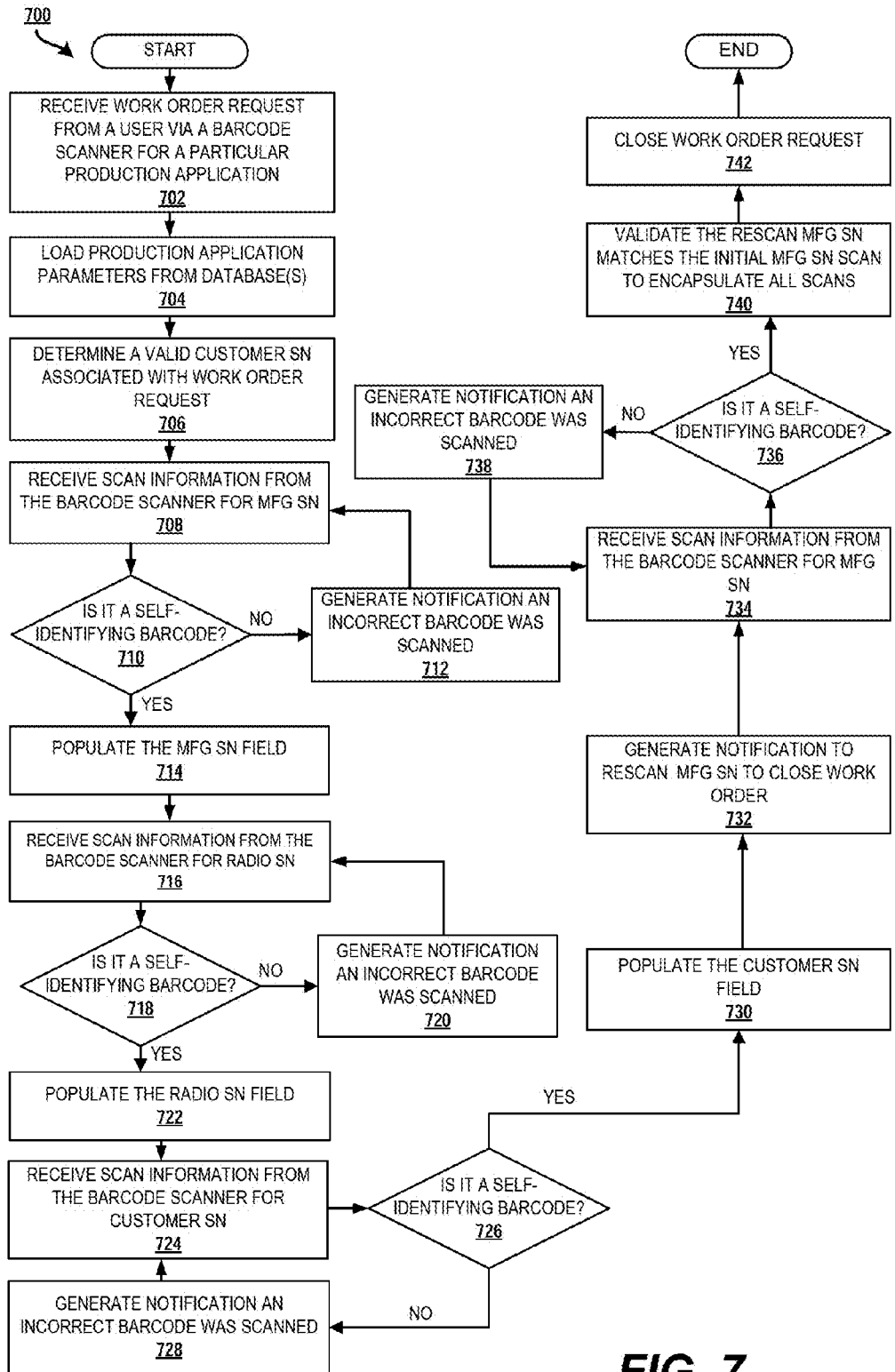
FIG. 7 is a flow diagram illustrating one method for implementing the self-identifying barcode production application, according to various aspects of the present disclosure.

FIG. 7 shows one example of a method 700 for implementing the self-identifying barcode production application with the self-identifying barcode system 100, according to various aspects of the present disclosure. The method 700 can enable a user to process a work order for a particular process application utilizing the self-identifying barcode label association processing module 110.

In this example aspect, the method 700 comprises the step of receiving a work order request to initiate a particular production application by a user scanning a particular self-identifying barcode, as indicated in step 702. At step 704, the self-identifying barcode system 100 loads the particular production application parameters from a database, such as database(s) 104. In the example aspect, the self-identifying barcode system 100 determines a valid customer serial number associated with the work order request at step 706. At step 708, the self-identifying barcode system 100 receives scan information from the barcode scanner for a manufacturing serial number, the first portion of the work order request in the example aspect.

The self-identifying barcode system 100, at step 710, determines if it is a self-identifying barcode. If not, at step 712, the self-identifying barcode system 100 generates a notification for the user that an incorrect barcode was scanned, and returns to the previous step, step 708, to wait and receive additional scan information. If a self-identifying barcode was scanned in step 710, the method 700 continues to step 714, and the self-identifying barcode system 100 populates the manufacturing serial number field. At step 716, the self-identifying barcode system 100 receives scan information from the barcode scanner for the second portion of the work order request, a radio serial number. Similar to step 710, at step 718 determines if it is a self-identifying barcode, and populates the radio serial number field. If step 718 determines it is not a self-identifying barcode, then at step 720 a notification is generated that an incorrect barcode was scanned and returns to the previous step, step 716, to wait and receive the correct scan information from a self-identifying barcode. If step 718 determines it is a self-identifying barcode, then at step 722 the radio serial number field is populated. This same methodology for a third portion of the work order request for a customer serial number continues for steps 724, 726, 728, and 730.

Subsequently the customer serial number field is populated in step 730, the method 700 proceeds and requests the user to scan once more the self-identifying barcode for the manufacturing serial number in order to close the work order and validate a self-identifying barcode is scanned in steps 732, 734, 736, 738. Once it is confirmed a proper manufacturing self-identifying barcode was scanned in step 736, at step 740, method 700 continues by validating the first manufacturing serial number scanned in step 708 matches the second manufacturing serial number scanned in step 734 in order to encapsulate all scans taken in method 700. At step 742, the self-identifying barcode system 100 closes the work order request.

Figure 8:
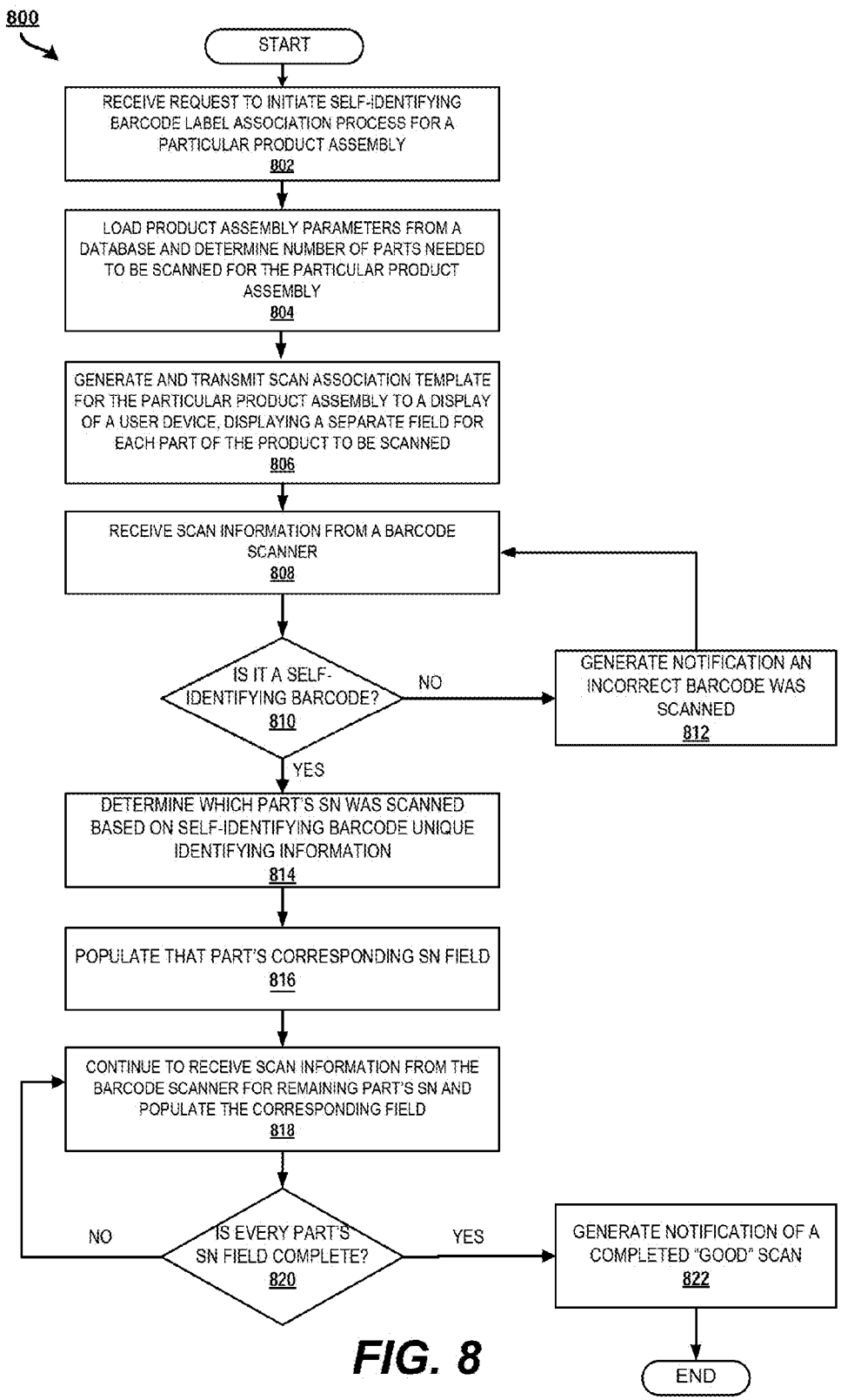
FIG. 8 is a flow diagram illustrating one method for implementing the self-identifying barcode label association application for a product assembly, according to various aspects of the present disclosure.

FIG. 8 shows one example of a method 800 for implementing the self-identifying barcode label association application for a product assembly with the self-identifying barcode system 100, according to various aspects of the present disclosure. The method 800 can enable a user to associate multiple parts of product assembly utilizing the self-identifying barcode label association processing module 110.

In this example aspect, the method 800 comprises the step of receiving a request to initiate a self-identifying barcode label association process for a particular product assembly, as indicated in step 802. In some aspects, receiving the request to initiate a self-identifying barcode label association process can comprise scanning a particular self-identifying barcode, or the user can select a particular product assembly from a user interface. At step 804, the self-identifying barcode system 100 loads the particular product assembly parameters from a database, such as database(s) 104. In the example aspect, the self-identifying barcode system 100 determines the number of parts associated with the particular product that will need to be scanned to complete the assembly.

At step 806, the self-identifying barcode system 100 generates and displays a scan association template for the particular product assembly to a user interface on a user device, or the like. On the display, each product part to the particular assembly will show a separate field so the user knows how many scans are needed to complete the assembly scan. For example, see screenshot 900, FIG. 9b. At step 808, the self-identifying barcode system 100 receives scan information from the barcode scanner 118. The self-identifying barcode system 100, at step 810, determines if it is a self-identifying barcode. If not, at step 812, the self-identifying barcode system 100 generates a notification for the user that an incorrect barcode was scanned, and returns to the previous step, step 808, to wait and receive additional scan information. If a self-identifying barcode was scanned in step 810, the method 800 continues to step 814, and the self-identifying barcode system 100 determines which part's serial number was scanned based on the self-identifying barcode's unique identifying information, as discussed herein for table 400, FIG. 4. At step 816, the self-identifying barcode system 100 populates the particular part's corresponding serial number field. For this example aspect, it is steps 810, 814, and 816 that differentiate and improve standard barcode systems which would populate the serial number of the first part on the list, e.g. "PCB SN" field 910, FIG. 9. The self-identifying barcode system 100 identifies which part it actually is for, and not just the serial number scanned, in order to minimize operator error.

Following step 816, the self-identifying barcode system 100 continues to receive scan information from the barcode scanner for the remaining part's corresponding serial numbers and populate the corresponding fields from every self-identifying barcode scanned at step 818. If, for example, the user rescans a part number already scanned, the system can notify the user of the duplicate scan, and still leave blank the intended field so the user knows to rescan a valid self-identifying barcode for the part intended. At step 820, the self-identifying barcode system 100 determines after each scan, if every part's serial number has been scanned, and every field in screenshot 900 has been filled. If not, then the self-identifying barcode system 100 continues to wait and receive scan information at step 818. Once it is determined that every field is complete for the product assembly, the self-identifying barcode system 100 will generate a notification of a completed "good" scan for the user at step 822, as displayed as indication 918, shown in screenshot 900, FIG. 9b.

FIGS. 9a-12 represent screenshots 900-1200 of a self-identifying barcode system 100 for encoding, printing, and utilizing a self-identifying barcode, using modules on the computer system 102 of FIG. 1 and/or computer architecture 200 of FIG. 2, such as the self-identifying barcode coding module 106, the self-identifying barcode printing module 108, or the self-identifying barcode label association processing module 110 of FIG. 1, and self-identifying barcode methods and systems as disclosed herein, according to examples of the present disclosure. The screenshots 900-1200 can be generated by the computing system when the computing system executes computer executable instructions configured to generate the screenshots.

Figure 9A:
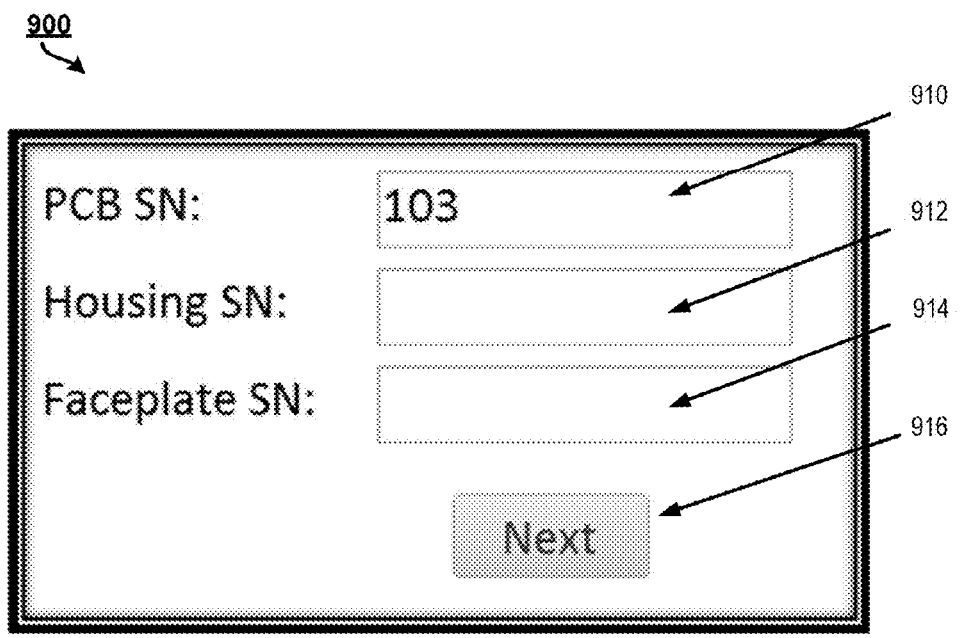
FIG. 9a is a screen diagram illustrating one aspect of a user interface presented by the self-identifying barcode application or other components of the self-identifying barcode system, according to various aspects of the present disclosure.

FIG. 9a illustrates an example screenshot 900 relating to the method 800 described above in regard to FIG. 8 for implementing the self-identifying barcode label association application for a product assembly with the self-identifying barcode system 100. However, FIG. 9a represents a common error in prior barcode scanning systems where a user will have accidentally scanned an incorrect barcode, so it doesn't register in the system, or missed the "PCB SN", field 910, and continued to scan the "Housing SN", field 912, and then "Faceplate SN", field 914. In this example, the previous barcode systems would populate the first field shown, field 910, with the housing serial number "103". If the user doesn't catch the error, the issues cascade through each field because they are quickly trying to scan several part numbers and product assemblies. A user can perform actions including, but not limited to: next product assembly (916). Other aspects can comprise additional options or can omit certain options shown herein.

Figure 9B:
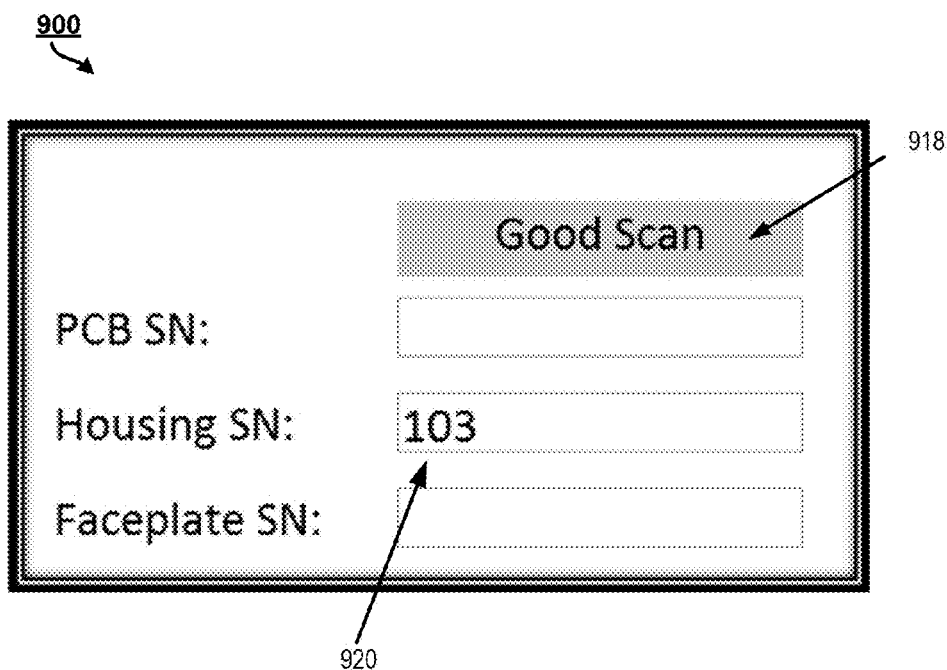
FIG. 9b is a screen diagram illustrating one aspect of a user interface presented by the self-identifying barcode application or other components of the self-identifying barcode system, according to various aspects of the present disclosure.

FIG. 9b illustrates an example screenshot 900 relating to the method 800 described above in regard to FIG. 8 for implementing the self-identifying barcode label association application for a product assembly with the self-identifying barcode system 100. In this example aspect, if the user made the same mistake as discussed above in the example in regards to FIG. 9a, the self-identifying barcode system 100 would populate the correct field, the housing serial number in field 920, because it recognizes the barcode field ID, as discussed herein for row 404 of table 400, FIG. 4. Further, the self-identifying barcode system 100 will generate a notification of a completed "good" scan for the user, as displayed as indication 918, once every part's serial number has been populated in the corresponding fields 910, 912, 914, etc.

Figure 10:
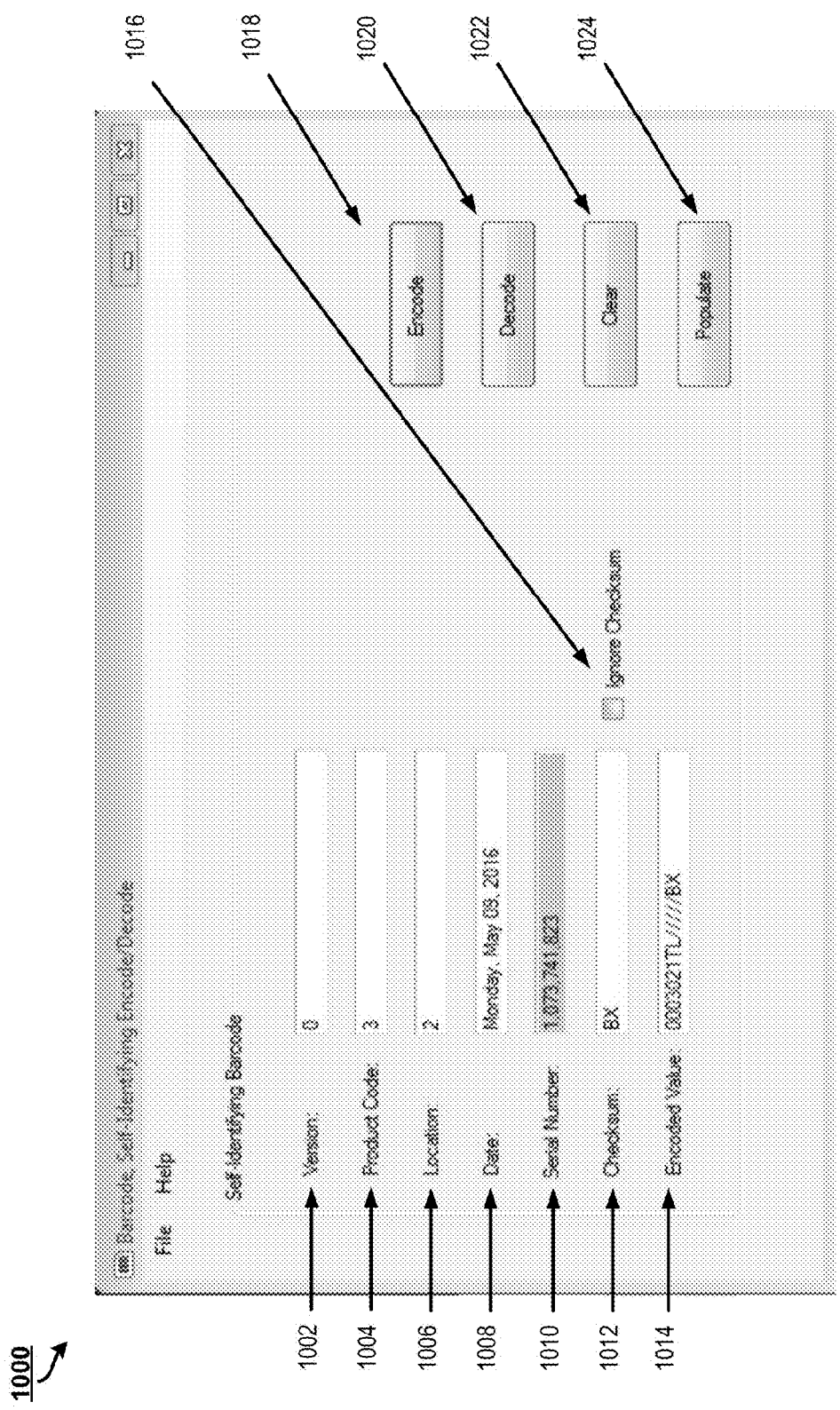
FIG. 10 is a screen diagram illustrating one aspect of a user interface presented by the self-identifying barcode application or other components of the self-identifying barcode system, according to various aspects of the present disclosure.

FIG. 10 illustrates an example screenshot 1000 relating to the method 500 described above in regard to FIG. 5 for implementing the encoding and decoding a self-identifying barcode with the self-identifying barcode system 100. As discussed herein for method 500, a user can manually fill in via a keyboard 234 and/or mouse, or retrieve information from a barcode scanner 118 for several fields including, but not limited to: version (1002), product code (1004), location (1006), date (1008), serial number (1010), checksum (1012), and encoded value (1014). Other aspects can comprise additional fields or can omit certain fields shown herein, depending on the self-identifying barcode algorithm implemented. The ignore checksum option (1016) provides the user the ability to override the use of a checksum in the encoding or decoding process. A user can perform actions including, but not limited to: encode (1018), decode (1020), clear (1022), and populate (1024). Other aspects can comprise additional options or can omit certain options shown herein.

Figure 11:
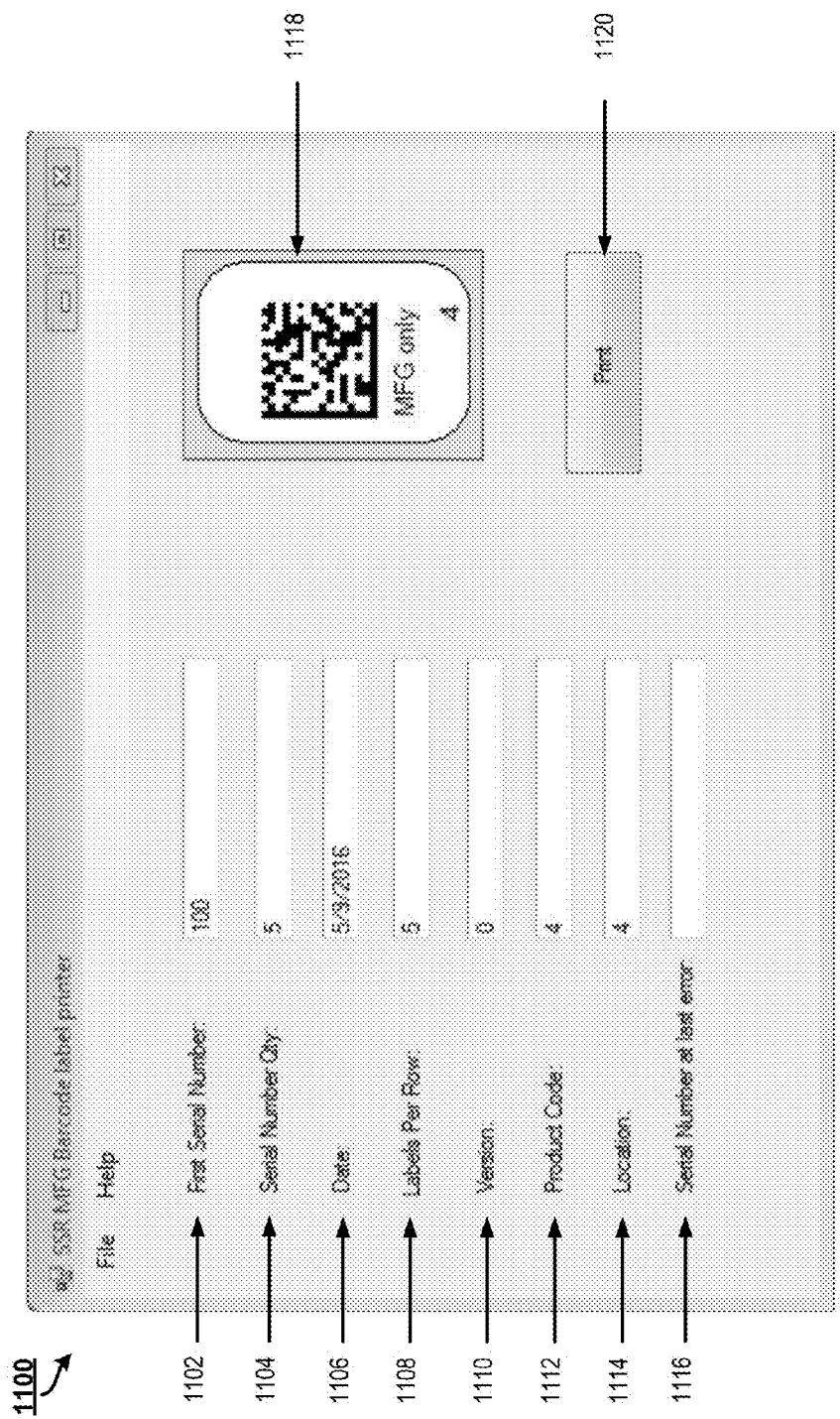
FIG. 11 is a screen diagram illustrating one aspect of a user interface presented by the self-identifying barcode application or other components of the self-identifying barcode system, according to various aspects of the present disclosure.

FIG. 11 illustrates an example screenshot 1100 relating to the method 600 described above in regard to FIG. 6 for implementing printing a self-identifying barcode with the self-identifying barcode system 100. As discussed herein for method 600, a user can manually fill in via a keyboard 234 and/or mouse, or retrieve information from a barcode scanner 118 for several fields including, but not limited to: first serial number (1102), serial number quantity (1104), date (1106), labels per row (1108), version (1110), product code (1112), location (1114), and serial number at last error (1116). Other aspects can comprise additional fields or can omit certain fields shown herein, depending on the self-identifying barcode algorithm implemented. Window 1118 displays the first self-identifying barcode label that will be sent to the barcode printer based on the parameters the user has entered into the fields. A user can perform actions including, but not limited to: print (1120). Other aspects can comprise additional options or can omit certain options shown herein.

Figure 12:
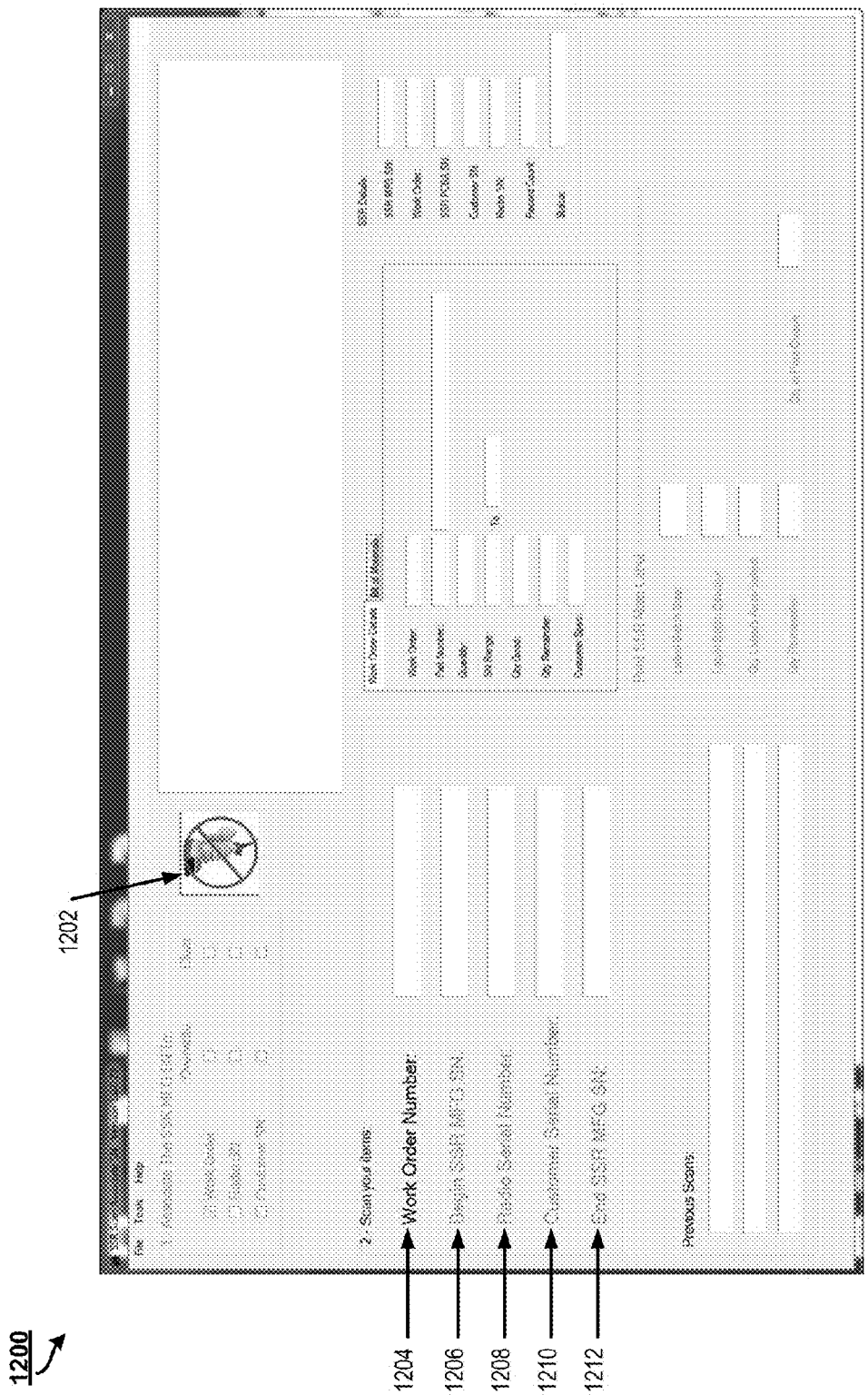
FIG. 12 is a screen diagram illustrating one aspect of a user interface presented by the self-identifying barcode application or other components of the self-identifying barcode system, according to various aspects of the present disclosure.

FIG. 12 illustrates an example screenshot 1200 relating to the method 700 described above in regard to FIG. 7 for implementing the encoding and decoding a self-identifying barcode with the self-identifying barcode system 100. As discussed herein for method 700, a user can manually fill in via a keyboard 234 and/or mouse, or retrieve information from a barcode scanner 118 for several fields including, but not limited to: work order number (1204), begin manufacturing serial number (1206), radio serial number (1208), customer serial number (1210), and end manufacturing serial number (1212). Other aspects can comprise additional fields or can omit certain fields shown herein, depending on the self-identifying barcode algorithm implemented. Barcode scanner icon 1202 can be displayed to the user to notify the user that the system is ready to begin scanning. Other aspects can comprise additional options or can omit certain options shown herein.

One benefit of the self-identifying barcode system 100 is the capability of sensing mistaken scans of an incorrect barcode and notifying a user of the mistake without having to modify the existing hardware by utilizing a standardized barcode. It would also be beneficial if the self-identifying barcode system 100 is used as a warehouse inventory control, as it can reduce labor when performing a physical inventory. It would also be beneficial if the self-identifying barcode system 100 is used as a production application control, e.g., tracking the final testing and configuration of the product assembly.

According to aspects described herein, the self-identifying barcode system 100 can provide more accurate data entry. When implemented, it can prevent scanning data from a barcode to an incorrect field. This can prevent, for example and without limitation, an operator from scanning a radio serial number in place of a meter serial number. The self-identifying barcode system 100 can lead to faster data entry because the operator does not need to be concerned if the operator is in the correct field. Further, the scanning order can be more tightly controlled and inevitably relaxed at the same time. The self-identifying barcode system 100 can prevent an operator from typing in a data field that should only be scanned.

With existing systems, operators can use a keyboard to override scanning operations; however, the self-identifying barcode system 100 can simplify programming by using a standard design pattern that is part of the self-identifying barcode system's 100 software. The self-identifying barcode system 100 can provide a simplified validation, as most of the validation is done within the self-identifying barcode software, and not by the operator. Furthermore, the self-identifying barcode system 100 can prevent an operator from typing in a data field that should only be scanned.

According to aspects described herein, the self-identifying barcode system 100 compresses data using a modified Base64 encoding method, which can pass through a scanner keyboard wedge program, ensuring that it will work with any scanner. The self-identifying barcode system 100 can provide credibility because it can comprise its own check sum to ensure the data read is actually a self-identifying barcode, and not another nearby barcode when the operator is scanning. The self-identifying barcode system 100 can also comprise compression, which reduces the number of characters stored in the barcode, and allows the use of a larger pitch, which in turn makes scanning faster and more reliable.

Other aspects can comprise additional options or can omit certain options shown herein. One should note that conditional language, such as, among others, "can," "could," "might," or "may," unless specifically stated otherwise, or otherwise understood within the context as used, is generally intended to convey that certain aspects comprise, while other aspects do not comprise, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are comprised or are to be performed in any particular aspect.

It should be emphasized that the above-described examples are merely possible examples of implementations and set forth for a clear understanding of the present disclosure. Many variations and modifications can be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be comprised within the scope of the present disclosure, and all possible claims to individual aspects or combinations of elements or steps are intended to be supported by the present disclosure.

What is claimed is:

1. A method of encoding self-identifying barcode data, comprising:

receiving, by a computer system, selection criteria from a user, wherein the selection criteria comprises one or more of a barcode version, a product code, a location, a date, a serial number, and a checksum version;

encoding, by the computer system, the self-identifying barcode data based on the selection criteria;

calculating, by the computer system, a checksum of the self-identifying barcode data based on the checksum version;

determining, by the computer system, whether the checksum is valid;

upon determining that the checksum is valid, appending, by the computer system, the checksum to the self-identifying barcode data; and sending, by the computer system, the self-identifying barcode data to an external device to generate a self-identifying barcode.

2. The method of claim 1, wherein the selection criteria is based on a plurality of character positions, and wherein each character position comprises a Base64-encoded character.

3. The method of claim 2, wherein each character position comprises an American Standard Code for Information Interchange (ASCII) value, and wherein the checksum is calculated by summing each ASCII value of each character position of the selection criteria.

4. The method of claim 1, wherein the encoding is configured to increment the serial number, and wherein the serial number is a unique and non-repeating number.

5. The method of claim 1, wherein the checksum version comprises a weighted checksum.

6. The method of claim 1, wherein the checksum version comprises a cyclic redundancy check.

7. The method of claim 1, further comprising:
subsequent to receiving the selection criteria, receiving, by the computer system, a code selection from the user for coding the self-identifying barcode data, the code selection comprising one of an encode and a decode;

performing, by the computer system, an error check based on the selection criteria and the code selection; and determining, by the computer system, whether the error check authorizes the code selection for coding the self-identifying barcode data to continue.

8. The method of claim 1, further comprising:
receiving, by a computer system, a printing request and printing selection criteria from the user;

performing, by the computer system, a printing error check based on the printing selection criteria and the printing request;

determining, by the computer system, whether the printing error check authorizes printing the self-identifying barcode; and upon determining that the printing error check authorizes printing the self-identifying barcode, generating, by the computer system, the self-identifying barcode based on the printing selection criteria.

9. The method of claim 1, further comprising:
receiving, by the computer system, scan information from a product from a barcode scanner;

determining, by the computer system, whether the scan information is from the self-identifying barcode;

upon determining that the scan information is from the self-identifying barcode, decoding, by the computer system, the scan information to create specification data corresponding to the product; and populating, by the computer system, a corresponding product field associated with the product.

10. The method of claim 9, wherein the product is a product assembly, the product assembly comprises a plurality of product parts, each product part comprises a part self-identifying barcode, the method further comprising:
receiving, by the computer system, scan information from each part self-identifying barcode from each product part;

populating, by the computer system, a corresponding product part field associated with each product part;

determining, by the computer system, whether all of the corresponding product part fields are complete; and upon determination that all of the corresponding product part fields are complete, generating, by the computer system, a notification of a completed product assembly scan.

11. A computer-readable storage medium having processor-executable instructions stored thereon that, when executed by a processor, cause the processor to:
receive selection criteria from a user, wherein the selection criteria comprises one or more of a barcode version, a product code, a location, a date, a serial number, and a checksum version;

encode self-identifying barcode data based on the selection criteria;

calculate a checksum of the self-identifying barcode data based on the checksum version;

determine whether the checksum is valid;

upon determining that the checksum is valid, append the checksum to the self-identifying barcode data; and send the self-identifying barcode data to an external device to generate a self-identifying barcode.

12. The computer-readable storage medium of claim 11, wherein the selection criteria is based on a plurality of character positions, and wherein each character position comprises a Base64-encoded character.

13. The computer-readable storage medium of claim 12, wherein each character position comprises an American Standard Code for Information Interchange (ASCII) value, and wherein the checksum is calculated by summing each ASCII value of each character position of the selection criteria.

14. The computer-readable storage medium of claim 11, wherein encoding the self-identifying barcode data is configured to increment the serial number, and wherein the serial number is a unique and non-repeating number.

15. The computer-readable storage medium of claim 11, wherein the checksum version comprises a weighted checksum.

16. A system comprising:
a memory;

a processor operably connected to the memory; and a self-identifying barcode coding module residing in the memory and configured to cause the processor to
receive selection criteria from a user, wherein the selection criteria comprises one or more of a barcode version, a product code, a location, a date, a serial number, and a checksum version;

encode self-identifying barcode data based on the selection criteria;

calculate a checksum of the self-identifying barcode data based on the checksum version;

determine whether the checksum is valid;

upon determining that the checksum is valid, append the checksum to the self-identifying barcode data; and send the self-identifying barcode data to an external device to generate a self-identifying barcode.

17. The system of claim 16, wherein the selection criteria is based on a plurality of character positions, and wherein each character position comprises a Base64-encoded character.

18. The system of claim 17, wherein each character position comprises an American Standard Code for Information Interchange (ASCII) value, and wherein the checksum is calculated by summing each ASCII value of each character position of the selection criteria.

19. The system of claim 16, wherein encoding the self-identifying barcode data is configured to increment the serial number, and wherein the serial number is a unique and non-repeating number.

20. The system of claim 16, wherein the checksum version comprises a cyclic redundancy check.

* * * * *